J. RAUCH.
Telegraph-Pole.
No. 218,062. Patented July 29, 1879.
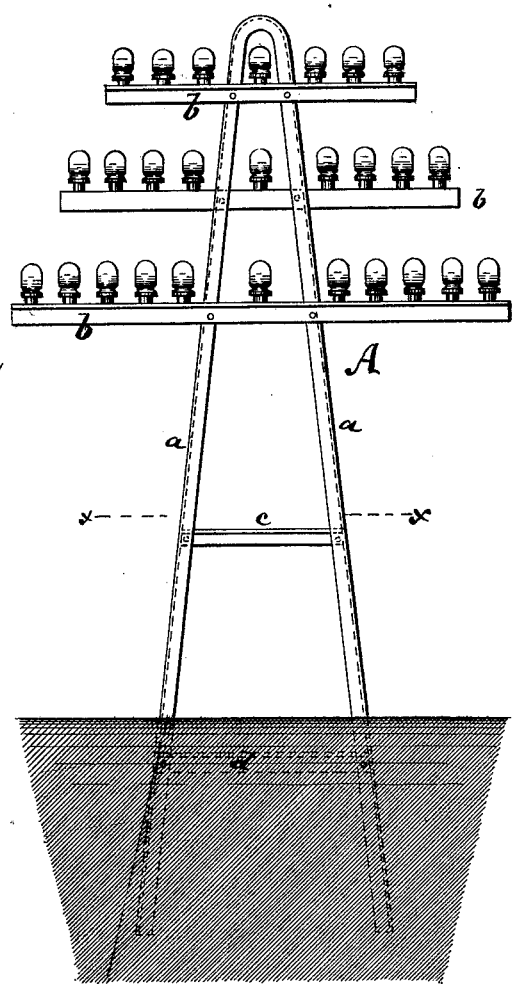
Fig: 1
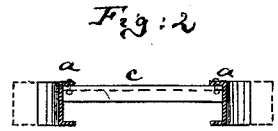
Fig: 2
Witnesses:
John C. Tunbridge
Willy J. E. Schultz
Inventor:
Jean Rauch
by his attorney
A. v. Briesen

UNITED STATES PATENT OFFICE.

JEAN RAUCH, OF FRANKFORT-ON-THE-MAIN, PRUSSIA, GERMANY.

IMPROVEMENT IN TELEGRAPH-POLES.

Specification forming part of Letters Patent No. 218,062, dated July 29, 1879; application filed April 24, 1879.

*To all whom it may concern:*

Be it known that I, JEAN RAUCH, of Frankfort-on-the-Main, Prussia, Germany, have invented a new and useful Improvement in Telegraph-Poles, of which the following is a specification.

This invention has for its object to improve the metallic telegraph-poles heretofore in use.

Heretofore these poles were similar to the wooden poles—single vertical uprights; but owing to the great weight of these metallic poles they had to be made comparatively thin, and offered but a narrow surface for the attachment of the horizontal arms that carry the insulators. At the same time these poles had to be sunk into the ground to a considerable depth, as they were heavy and had but a narrow base.

Now, my invention consists in making each telegraph-pole of two uprights, which are connected at the top and diverge toward the base, and which are combined by a horizontal brace, which serves to anchor them in the ground, as hereinafter more fully pointed out.

In the accompanying drawings, Figure 1 is a front elevation of my improved telegraph-pole. Fig. 2 is a horizontal section on the line $x\ x$, Fig. 1.

Similar letters of reference indicate corresponding parts in both figures.

The letter A represents my improved telegraph-pole. The same is made of rolled or other metal, and consists of two inclined uprights, $a\ a$, that are united at the top and diverge toward the base. The shape of the pole A in vertical longitudinal section is therefore that of the letter A. $b\ b$ are the horizontal arms that carry the insulators in the usual or suitable manner. The arms $b\ b$ are fastened to flanges projecting from the edge of the uprights $a\ a$, which uprights are made U-shaped in horizontal section, as shown in Fig. 2; but the uprights may be made L-shaped in horizontal section, in which case the arms $b$ can be fastened to one side only of the uprights.

The arms $b\ b$ may be fastened to the flanges of the uprights $a\ a$ by pins, rivets, screws, or other fastening devices, the flanged uprights offering ample surface for their attachment.

$c$ and $d$ are horizontal braces, which connect the uprights $a\ a$. The brace $d$ is applied near the lower end of the pole, so that it will be under ground when the pole is put up, and serves to anchor the same. The pole A will be firmly supported in the ground, even if inserted to a short distance therein.

I claim—

The combination of the A-shaped telegraph-pole A with the horizontal brace $d$, which serves to anchor it in the ground, substantially as specified.

This specification signed by me this 6th day of March, 1879.

JEAN RAUCH.

Witnesses:
    Dr. G. RADERMACHER,
    D. SHÄFER.